United States Patent [19]

Carpenter et al.

[11] Patent Number: 4,759,216
[45] Date of Patent: Jul. 26, 1988

[54] PRESSURE-ACTUATED ELECTRICAL SPEEDOMETER

[75] Inventors: William R. Carpenter, Muskegon; Robert D. Talmadge, Grand Haven, both of Mich.

[73] Assignee: MI Inc., Spring Lake, Mich.

[21] Appl. No.: 936,630

[22] Filed: Dec. 1, 1986

[51] Int. Cl.$^4$ ............................................. G01C 21/10
[52] U.S. Cl. ......................................... 73/182; 73/431
[58] Field of Search ................... 73/182, 178 R, 431, 73/717, 718, 719, 720, 721, 722, 723, 724, 725, 726, 727, 728, 729, 181

[56] References Cited

U.S. PATENT DOCUMENTS 4,598,292   7/1986   Devino ........................... 73/178 R

*Primary Examiner*—Donald O. Woodiel
*Attorney, Agent, or Firm*—Price, Heneveld, Cooper, DeWitt & Litton

[57] ABSTRACT

The specification discloses an electrically-operated marine craft speedometer in which velocity-indicative pitot tube impact pressure is conveyed through a conduit to a pressure transducer carried by the speedometer case. An electrically-actuated speedometer readout display mounted on the case is driven by electrical control circuitry which receives an electrical output signal from the pressure transducer. The speedometer case is preferably provided with a pressure chamber in which the pressure transducer is disposed, and means are provided for coupling the pressure chamber to the pitot tube so as to receive impact pressure therefrom.

7 Claims, 2 Drawing Sheets

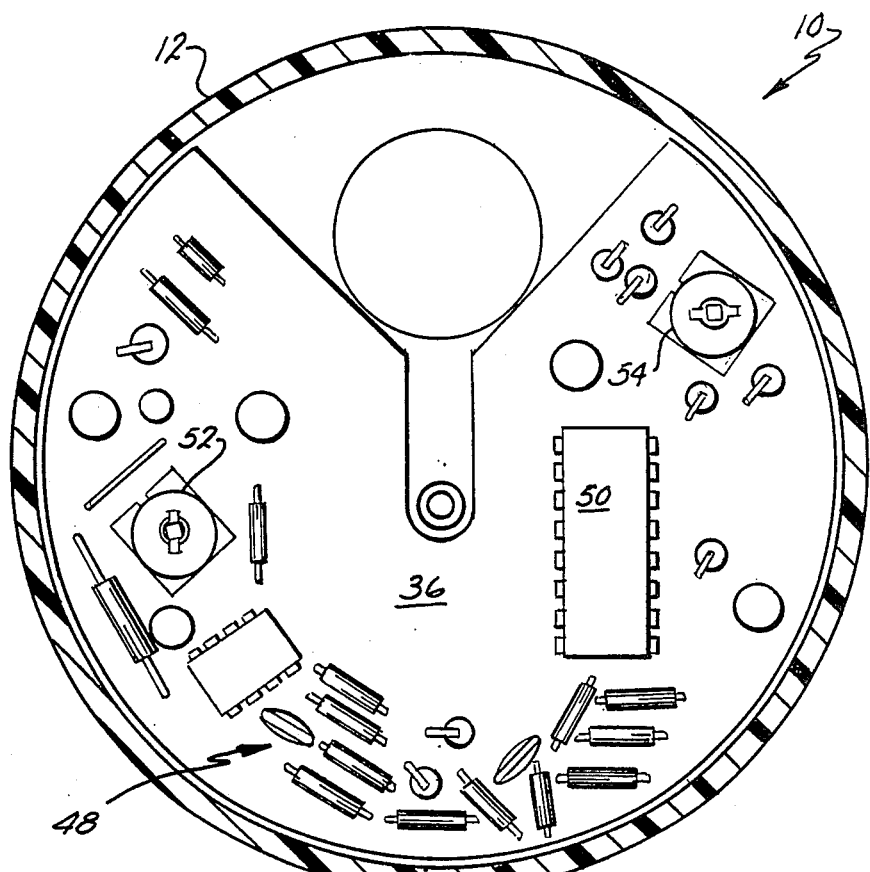
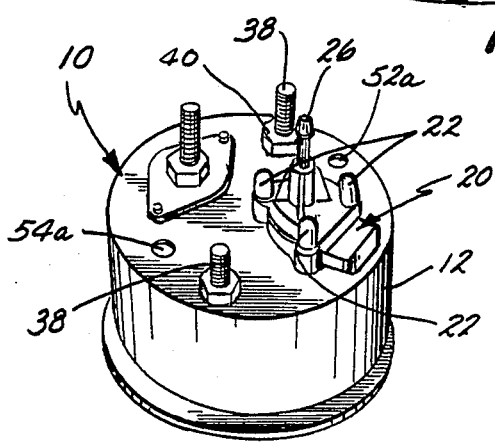
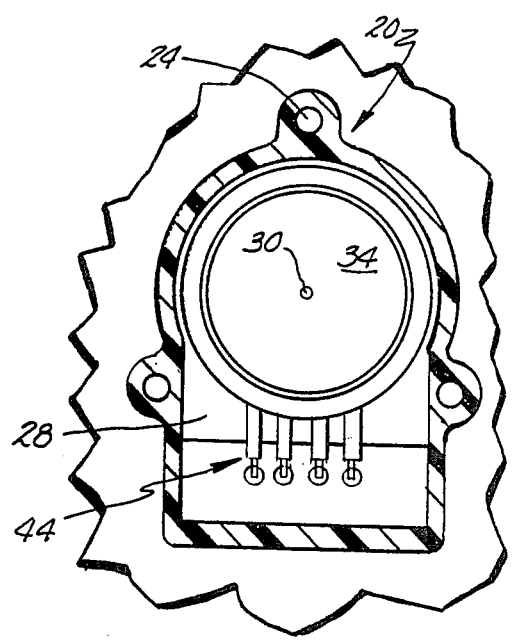
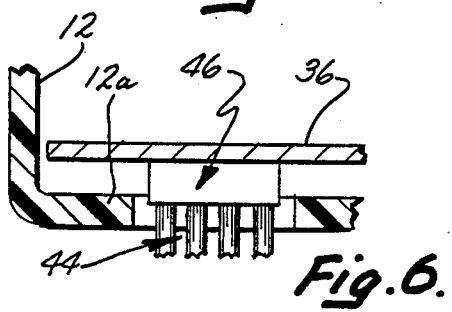

4,759,216

PRESSURE-ACTUATED ELECTRICAL SPEEDOMETER

TECHNICAL FIELD

This invention relates to the general field of instrumentation, e.g., visible-readout meters and gauges, and more particularly to vehicle instruments. More particularly still, the invention relates to marine instruments, especially marine speedometers and the like such as have historically been actuated by use of pitot tube impact pressures.

BACKGROUND OF THE INVENTION

Conventional marine speedometers have traditionally been based upon the use of pitot tubes, which are secured to the craft in a manner such that the pitot tube is drawn through the water as the craft moves, thereby creating an impact pressure which is utilized to pneumatically actuate a speedometer of a type comprising in effect a species of mechanical gauge. Examples of typical preferred such pitot tubes are shown in commonly-owned prior U.S. Pat. Nos. 3,181,356 and 4,070,909, which are incorporated herein by reference.

While such conventionally-known types of marine speedometers are generally reliable devices which are in many common applications reasonably acceptable, there are a number of instances in which it would be desirable to utilize electrically-actuated meter movements or displays in order to implement more advanced formed of instrumentation as marine speedometers. This development has for the most part been precluded heretofore, however, largely because appropriate velocity sensors or pickups for such applications have not been discovered by the marine industry, apart from a paddle wheel-type device which has a very limited range of application, principally being suitable for use at only very low velocities and, in particular, on marine craft with non-planing hull designs. Accordingly, there has until now been little or nothing of a commercial nature in electrically-operated marine speedometers which are suitable to ski boats, racing hulls, and a wide variety of analogous pleasure boats.

The aforementioned gap in the development of modern speedometer instrumentation for marine craft has been increasingly acute in relation to modern automotive speedometer instrumentation development, for example, in which a number of electrically-operated instruments have been developed with strikingly contemporary and innovative characteristics, e.g., digital speedometers and sweep-type or moving-field liquid crystal display devices. As will be appreciated, these types of speedometers are usually perceived by speed enthusiasts as being exciting developments which are equally desirable in marine craft, particularly in those boats which are utilized in speed-oriented recreational activities such as those noted above. Nonetheless, until the advent of the present invention no reliable and proven system was available by which such new instrumentation trends could be utilized in marine craft and in fact electrically-actuated marine speedometers in and of themselves have been encountered only on a very infrequent basis compared to the typical and customary pitot tube-impact pressure speedometer system.

SUMMARY OF THE INVENTION

The present invention provides a new and innovative solution to the situation discussed above, thereby satisfying the long-existent requirement or need described. This is accomplished by providing a number of related new concepts for marine instrumentation generally, and in particular by providing a new hybrid-type of instrument, which not only facilitates the instrumentation during manufacture of new marine craft but in fact makes possible the use therein of new and modern forms of electrically-operated speedometer instruments. Additionally, the invention provides the highly desirable advantage of making possible the direct retrofitting of marine craft which have the conventional form of impact-operated mechanical speedometer system, i.e., allowing for direct and expeditious replacement of the latter with modern types of electrical speedometer movements without the requirement of substantial reconstruction or structural change to the existing system.

Accordingly, the present invention provides a composite new instrument and system by which known reliable forms of marine pitot tube-type velocity pickups may continue to be utilized, so as to take advantage of the favorable attributes of the known technology, while nonetheless providing a direct and efficient means for converting the pitot tube impact pressure sense signal into useful electrical speedometer drive signals. Additonally, the invention provides for utilizing such electrical signals in modern forms of speedometer apparatus, e.g., liquid crystal display-type and digital-readout speedometers.

The attributes, features and advantages of the invention briefly referred to above will become more apparent and better understood by reference to the ensuing specification setting forth certain specific preferred embodiments of the invention, particularly when taken in conjunction with the appended drawings depicting such preferred embodiments.

BRIEF DESCRIPTION OF THE DRAWINGS

In the drawings:

FIG. 2 is a rear perspective view, on a reduced scale, of the instrument shown in FIG. 1;

FIG. 4 is a fragmentary, sectional end elevational view taken along the plane IV—IV of FIG. 3;

FIG. 5 is a sectional elevational view taken along the plane V—V of FIG. 3; and

FIG. 6 is an enlarged, sectional plan view taken along the plane VI—VI of FIG. 3.

DESCRIPTION OF PREFERRED EMBODIMENTS

Figure 1:
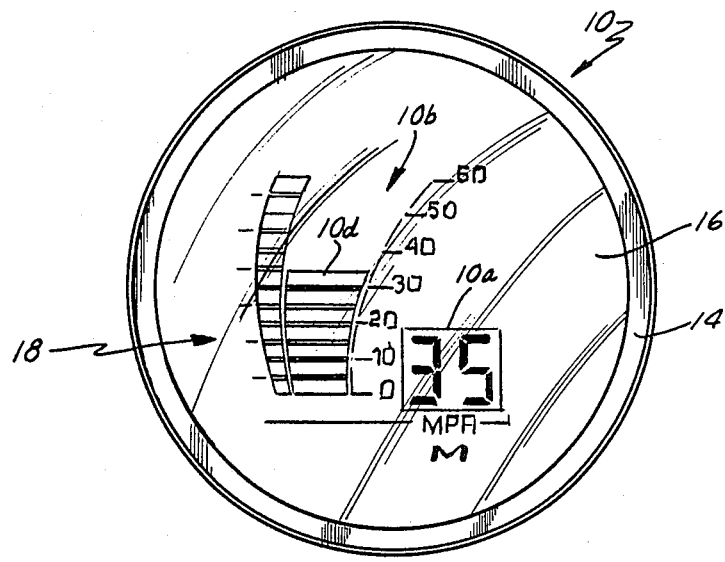
FIG. 1 is a front elevation view of an illustrative electrically-actuated marine speedometer made possible in accordance with the invention.

As illustrated in the various Figures of the drawings, the invention is depicted in the form of a specific instrument embodiment 10, in this case comprising a digital-readout speedometer having a case 12, front bezel 14, front lens or face plate 16, digital-readout liquid crystal display 18, and other attributes described more particularly hereinafter. In a general way, the case 12 may be considered to be of the same general type as those used in known instruments, comprising a hollow cylindrical housing of phenolic or polymeric material, etc., although the housing 12 also contains other structural features of a non-conventional nature, as pointed out hereinafter. The front bezel 14 and lens or face plate 16 may be considered typical of known commercial instruments of the general type involved (e.g., marine pitot tube impact pressure-actuated speedometers).

As noted above, the case 12 of instrument 10 includes structural refinements not to be found in conventional marine speedometers or the like. In the first place, it will be noted that the case 12 carries a sealed closure 20 on its rear face (FIGS. 2 and 3), secured in place (in this particular embodiment) by at least three mutually-spaced fasteners 22 (e.g., nylon nuts) which are tightened down upon appropriate studs 24 extending to the back of the case 12. As may be observed, the closure 20 has a barbed tubular pneumatic nipple or fitting 26 projecting outwardly therefrom, for receiving a pneumatic velocity sense line, e.g., a hose or tube extending from the pitot tube (not shown), which is secured in place over fitting 26 as by a conventional hose clamp or other desired means.

The aforementioned closure 20 constitutes the rear cover of a pressure chamber 28 (FIGS. 3 and 4) which comprises a particularly-configured recess cooperatively formed in the rear surface of the case 12 and in the front surface of the closure or cover member 20. An appropriate seal such as an O-ring 32 is disposed between the closure 20 and the back of the case 12 to seal the pressure chamber 28 from external ambient pressure conditions, and the pressure chamber communicates with the interior of the case 12 through a vent orifice 30 which may be sized to maintain a desired static pressure head where necessary. The sealed pressure chamber 28 encloses a pressure transducer 34, referred to in more detail hereinafter.

Inside the case 12, an electrical circuit board 36 is mounted in spaced relation with respect to the back wall 12a of the case, preferably by mounting studs 38 which are rigidly secured to the circuit board 36 and extend through the rear wall of the case to receive lock washers and nuts 40, or other such mechanical fasteners. Mounting studs 38 preferably constitute electrical connections as well, by which operating power and an appropriate electrical ground is connected to circuit board 36. Spaced forwardly of the circuit board 36 is the liquid crystal numeric display element 42, which may be a component of a known type that is available commercially from any of a number of sources. As illustrated, appropriate electrical connections extend between the display element 42 and the electrical circuit board 36 along and/or as part of a central display support and mounting member 43, by which the display 42 is supported in place within the case and coupled to the circuit board 36 for electrical drive excitation. Of course, it is to be understood that many different specific examples, and types, of electrically-actuated display means may be utilized in accordance with the broader aspects hereof, appropriate signal conversion or adaptation interface circuitry being provided as necessary, in accordance with the requirements of a given display apparatus.

The pressure transducer 34 preferably comprises a commercially-available device, of a general type typically used for other (non-speedometer) applications such as fluid pressure-responsive control members, as for example are used in hydraulic apparatus such as automatic transmissions. For example, the pressure transducer may comprise a device such as that made and sold by Motorola such as that designated by the identification "MPX 200", which in essence is a transverse-voltage strain-gauge-type device having a thermoplastic outer case and a metal cover and backplate which have centralized apertures for admitting the pressure to be sensed, there being an internal diaphragm which reacts to the sensed pressures by imparting corresponding movement to a piezoresistive strain gauge.

Figure 3:
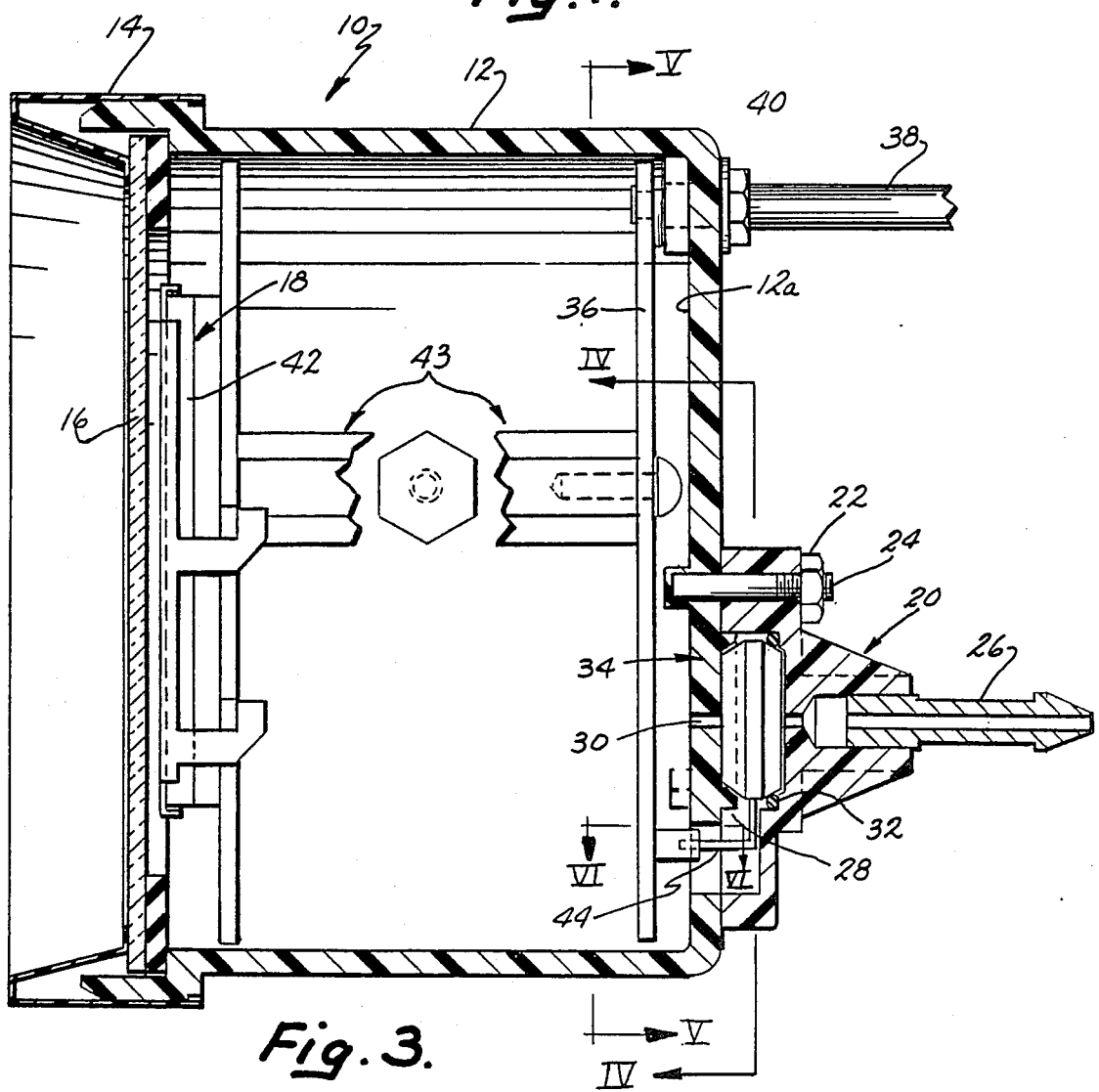
FIG. 3 is an enlarged, sectional side elevational view of the instrument shown in the preceding Figures.

As illustrated, the pressure transducer 34 has an integral, outwardly-projecting, multiple-pin electrical connector 44 by which it receives operating excitation and from which it outputs electrical signals corresponding to the pressure applied through fitting 26. As shown in FIGS. 3 and 4, the multiple-pin connector 44 extends at right angles with respect to the plane of the pressure transducer 34 and connects into a terminal block 46 disposed on the rearward side of the circuit board 36. Thus, it will be readily appreciated that conductive strips (not specifically shown) on the rear side of circuit board 36 which are interconnected with the main supply posts 38 projecting outwardly through the rear face of case 12 may conveniently be interconnected with selected ones of the pins 44. Also, printed circuit board 36 may readily connect, through well known techniques, to various electrical components 48 (FIG. 5) mounted on the opposite side of the circuit board and having electrical leads extending through the latter, as well as with the central display support and mounting member 44 which is connected to the liquid crystal display means 18.

In accordance with the foregoing, it will be readily appreciated that by coupling velocity-representative pitot tube pressure to the fitting 26, and by connecting appropriate operating voltage and ground to the respective supply post 38, an electrical output will be obtained from transducer 34 via pins 44, which is coupled to the electrical circuitry respresented by circuit board 36. Accordingly, the electrical outputs from the pressure transducer may be processed in a desired manner and conditioned as necessary to drive an electrical speedometer apparatus (numeric display) such as the LCD display device 18. As illustrated in FIG. 1, such an apparatus may incorporate a digital display 10a which utilizes numbers to directly indicate the speed sensed by the pitot tube, together with (or in the alternative) any of a variety of imaginative and aesthetic analog-type displays such as the contemporary bar-graph arrangement generally indicated at 10b, which incorporates not only a number sequence 10c, but a variable-color moving-field display 10d as well. As will be appreciated by those skilled in the electrical speedometer art, digital and other such displays are in general well known in the art, in and of themselves, as of the present point of time, as are the electrical drive requirements and various specific circuitry for supplying such drive excitation. Such drive circuitry is generally symbolized by the components 48 which, in a number of instances, will desirably include a microprocessor 50 and other digital components, as well as an analog-to-digital converter, since the output from pressure transducer is an analog-type varying-level d.c. signal whereas most liquid crystal displays require pulse-type or alternating drive signals. Desirably, the circuitry 48 also includes adjustable "trimmer" components such as the capacitors and/or potentiometers, tunable inductors, etc., indicated at 52 and 54, and these are preferably made accessible through appropriate openings 52a and 54a in the rear face of the outer case 12.

Accordingly, the present invention provides a novel instrumentation concept and structure which incorporates pressure-responsive means built directly into (or otherwise integrated with) an electrically-operated meter device. By so doing, the apparatus of the invention parallels physical instrumentation concepts familiar to those skilled in the art of marine speedometers and the like, in that there is an established familiarity with the use of marine pitot tube-velocity sensors, and with the impact-pressure transmitted lines associated therewith, which traditionally have been routed to the back of the speedometer casing. Also, conventional pressure-actuated speedometers are frequently connected to electrical operating power, even though merely for the purpose of providing illumination as desired. At the same time, all of the more modern concepts of electrical speedometer actuation and display are made available in a pressure-responsive device. This basic approach not only lends itself advantageously to solving the basic underlying requirement and problem, but additonally lends itself to ready and simple retrofitting of the mechanical form of speedometer used heretofore in conjunction with pitot tube pressure lines, since in essence it allows the direct replacement of the mechanical type of speedometer used heretofore by the new form of electrically-actuated speedometer made possible in accordance herewith, direct substitution in fact being entirely possible.

It is to be understood that the above described description is merely that of one exemplary preferred embodiment of the invention, and that numerous changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows:

1. A hybrid electrically-operated speedometer for a marine craft, comprising in combination: an instrument case having peripheral walls defining a protected interior space; a pressure chamber carried by said peripheral walls and having a fitting accessible from outside said case which is adapted to be coupled to a marine pitot tube impact pressure conduit, for receiving pitot tube impact pressure from a remote location through said conduit; a pressure transducer carried by said case and disposed in communication with said pressure chamber to access said impact pressure from said conduit and fitting, said transducer having electrical output terminals for providing an electrical output signal representative of said impact pressure; an electrical instrumentation readout display-generation means mounted on said case for viewing from without the latter; and electrical circuit means for actuating said readout display-generation means, said circuit means being disposed within said case and coupled electrically between said transducer output terminals and said display-generation means to actuate said display-generation means in relation to said impact pressure from said conduit.

2. The marine craft speedometer as defined in claim 1, wherein said peripheral walls of said instrument case define at least portions of said pressure chamber.

3. The marine craft speedometer as defined in claim 2, wherein said portions of said pressure chamber defined by said peripheral walls are disposed on the outside of said case, and further including a removable cover secured in place over such portions to substantially close said pressure chamber.

4. The marine craft speedometer as defined in claim 3, wherein said cover carries said impact pressure fitting.

5. The marine craft speedometer as defined in claim 1, wherein said electrical instrumentation readout display-generation means comprises a liquid crystal display means.

6. The marine craft speedometer as defined in claim 1, wherein said electrical instrumentation readout display-generation means comprises a digital readout display.

7. A marine speedometer, comprising in combination: a housing; electrically-operated speedometer display means mounted in said housing; a pressure transducer carried on said housing; means for coupling said transducer to a marine pitot tube such that velocity-related impact pressure produced by such pitot tube is applied to said transducer at said housing; and electrical drive circuit means connected between said transducer and said display means for receiving an electrical output produced by said transducer in response to the application thereto of said impact pressure and energizing said display means correspondingly such that the latter displays a speed indication which is a function of pitot tube impact pressure.

* * * * *